(12) United States Patent
Pokorny et al.

(10) Patent No.: US 7,510,741 B2
(45) Date of Patent: Mar. 31, 2009

(54) METHOD OF MAKING MULTILAYER CHOLESTERIC LIQUID CRYSTAL OPTICAL BODIES

(75) Inventors: Richard J. Pokorny, Maplewood, MN (US); Marc D. Radcliffe, Newport, MN (US); Steven D. Solomonson, Shoreview, MN (US); Terence D. Spawn, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 973 days.

(21) Appl. No.: 10/858,238

(22) Filed: Jun. 1, 2004

(65) Prior Publication Data

US 2005/0266158 A1 Dec. 1, 2005

(51) Int. Cl.
| | | |
|---|---|---|
| *B05D 5/06* | (2006.01) | |
| *B05D 7/00* | (2006.01) | |
| *B05D 3/00* | (2006.01) | |
| *G02F 1/13* | (2006.01) | |
| *C09K 19/02* | (2006.01) | |
| *C09K 19/42* | (2006.01) | |

(52) U.S. Cl. .................. 427/162; 427/163.1; 427/407.1; 427/384

(58) Field of Classification Search .................. 427/162, 427/163.1, 407.1, 372.2, 384; 349/115, 86–94, 349/175–176, 185; 252/299.01, 299.67
See application file for complete search history.

(56) References Cited

U.S. PATENT DOCUMENTS

| | | | |
|---|---|---|---|
| 4,293,435 A | 10/1981 | Portugall et al. | |
| 4,974,941 A | 12/1990 | Gibbons et al. | |
| 5,032,009 A | 7/1991 | Gibbons et al. | |
| 5,332,522 A | 7/1994 | Chen et al. | |
| 5,389,698 A | 2/1995 | Chigrinov et al. | |
| 5,602,661 A | 2/1997 | Schadt et al. | |
| 5,691,789 A | 11/1997 | Li | |
| 5,744,057 A | 4/1998 | Meyer et al. | |
| 5,780,629 A | 7/1998 | Etzbach et al. | |
| 5,838,407 A | 11/1998 | Chigrinov et al. | |
| 5,847,068 A | 12/1998 | Maxein et al. | |
| 5,886,242 A | 3/1999 | Etzbach et al. | |
| 5,958,293 A | 9/1999 | Gibbons et al. | |
| 6,001,277 A | 12/1999 | Ichimura et al. | |
| 6,057,008 A * | 5/2000 | Schwalb et al. | 428/1.1 |
| 6,395,354 B1 | 5/2002 | Sahouani et al. | |
| 6,876,427 B2 * | 4/2005 | Bowley et al. | 349/185 |
| 2002/0159019 A1 * | 10/2002 | Pokorny et al. | 349/187 |
| 2004/0150773 A1 | 8/2004 | Li et al. | |
| 2004/0165140 A1 | 8/2004 | Pokorny | |

FOREIGN PATENT DOCUMENTS

| | | |
|---|---|---|
| EP | 0 606 940 A | 7/1994 |
| EP | 834754 | 4/1998 |

OTHER PUBLICATIONS

Haeberle, N. et al, "Right and Left Circular Polarizing Colorfilters Made From Crosslinkable Cholesteric LC-Silicones" Proceedings of the International Display Research Conference. San Diego, Oct. 15-17, 1991, New York, IEEE, US, vol. Conf. 11, Oct. 15, 1991, pp. 57-59, XP000314327 ISBN: 0-7803-0213-3.

* cited by examiner

*Primary Examiner*—William Phillip Fletcher, III
(74) *Attorney, Agent, or Firm*—Jay R. Pralle

(57) ABSTRACT

Methods of making an optical body include coating a mixture including a first cholesteric liquid crystal polymer, a second cholesteric liquid crystal monomer, a second cholesteric liquid crystal polymer formed from a portion of the second cholesteric liquid crystal monomer, and a solvent on a substrate. The first cholesteric liquid crystal polymer is different than the second cholesteric liquid crystal polymer. Then, forming from the mixture an optical body including a first layer, a second layer, and a third layer disposed between the first and second layer. The first layer includes a majority of the first cholesteric liquid crystal polymer. The second layer includes a majority of a second cholesteric liquid crystal monomer. The third layer includes the second cholesteric liquid crystal polymer.

16 Claims, 8 Drawing Sheets

METHOD OF MAKING MULTILAYER CHOLESTERIC LIQUID CRYSTAL OPTICAL BODIES

FIELD OF THE INVENTION

The present invention relates to optical bodies containing cholesteric liquid crystals. The present invention also relates to reflective optical polarizers formed by three or more layers of cholesteric liquid crystals or cholesteric liquid crystal precursors. Specifically, the invention relates to methods and apparatus for forming three or more cholesteric liquid crystal layers with a single coating composition on a substrate.

BACKGROUND OF THE INVENTION

Optical devices, such as polarizers and mirrors, are useful in a variety of applications including liquid crystal displays (LCD's). Liquid crystal displays fall broadly into two categories: backlit (e.g., transmissive) displays, where light is provided from behind the display panel, and frontlit (e.g., reflective) displays, where light is provided from the front of the display (e.g., ambient light). These two display modes can be combined to form transflective displays that can be backlit, for example, under dim light conditions or read under bright ambient light.

Conventional backlit LCDs typically use absorbing polarizers and can have less than 10% light transmission. Conventional reflective LCDs are also based on absorbing polarizers and typically have less than 25% reflectivity. The low transmission or reflectance of these displays reduces display contrast and brightness and can require high power consumption.

Reflective polarizers have been developed for use in displays and other applications. Reflective polarizers preferentially transmit light of one polarization and preferentially reflect light having an orthogonal polarization. It is preferred that reflective polarizers transmit and reflect light without absorbing relatively large amounts of the light. Preferably, the reflective polarizer has no more than 10% absorption for the transmission polarization. Many optical devices operate over a broad range of wavelengths and, as a consequence, the reflective polarizer must typically operate over that broad wavelength range, as well. When used as selective reflection mirrors, such optical devices must also operate over a broad wavelength range.

SUMMARY OF THE INVENTION

Generally, the present invention relates to optical bodies containing cholesteric liquid crystals and their manufacture, as well as the use of cholesteric liquid crystals in optical devices, such as reflective polarizers, selective reflection mirrors, and the like. Methods and apparatus for forming three or more cholesteric liquid crystal layers with a single coating composition on a substrate are described.

Methods of making an optical body are disclosed. A method includes the steps of coating a mixture including a first cholesteric liquid crystal polymer, a second cholesteric liquid crystal monomer, a second cholesteric liquid crystal polymer formed from a portion of the second cholesteric liquid crystal monomer, and a solvent on a substrate. The first cholesteric liquid crystal polymer is different than the second cholesteric liquid crystal polymer. Then, forming from the mixture an optical body including a first layer, a second layer, and a third layer disposed between the first and second layer. The first layer includes a majority of the first cholesteric liquid crystal polymer. The second layer includes a majority of a second cholesteric liquid crystal monomer. The third layer includes the second cholesteric liquid crystal polymer.

In another illustrative embodiment, a method of making an optical body includes the steps of coating a mixture having a first cholesteric liquid crystal polymer, a second cholesteric liquid crystal monomer, a second cholesteric liquid crystal polymer formed from the second cholesteric liquid crystal monomer, and a solvent on a substrate to form a coated substrate. The first liquid crystal polymer is different that than the second cholesteric liquid crystal polymer. The coated substrate is heated to remove a portion of the solvent. The coated substrate is cured to form a partially cured coated substrate. Then, the partially cured coated substrate is heated to form an aligned optical body.

In a further illustrative embodiment, a method of making an optical body includes the steps of coating a mixture having a first cholesteric liquid crystal polymer, a second cholesteric liquid crystal monomer, a second cholesteric liquid crystal polymer formed from the second cholesteric liquid crystal monomer, and a solvent on a substrate to form a coated substrate. The first liquid crystal polymer is different that than the second cholesteric liquid crystal polymer, to form a coated substrate. An optical body is then formed from the mixture. The optical body reflects circular polarized light when light is transmitted through the optical body.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
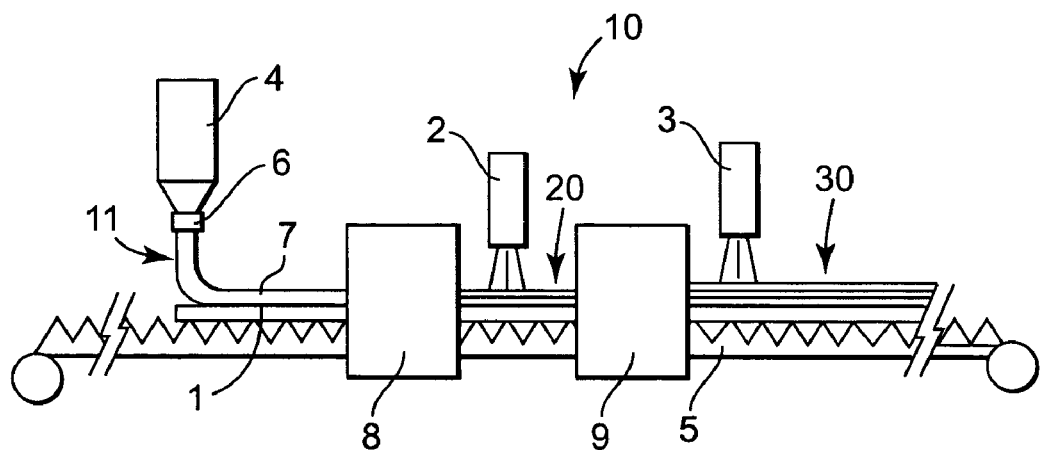
FIG. 1 is a schematic representation of one embodiment of a method and apparatus for forming three cholesteric liquid crystal layers with a single coating composition on a substrate, according to the invention.

The drawings, which are not necessarily to scale, depict illustrative embodiments of the claimed invention. In particular, the layers shown in the drawings are not necessarily to scale. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to optical bodies (such as optical films) and their manufacture, as well as the use of the optical bodies in optical devices, such as reflective polarizers, selective reflection mirrors, solar control films and optical displays (e.g., liquid crystal displays). The present invention is also directed to optical bodies containing cholesteric liquid crystals. While the present invention is not so limited, an appreciation of various aspects of the invention will be gained through a discussion of the examples provided below.

For the following defined terms, these definitions shall be applied, unless a different definition is given in the claims or elsewhere in this specification.

The term "layer" will be understood to include a single physical thickness or a single optical thickness. A single physical thickness can include a distinct boundary layer or can include a non-distinct boundary layer such as, for example, a compositional gradient between layers. A single optical thickness can be observed by an optical property such as, for example, reflection of light about a range of wavelengths. It is understood that zones between layers can include one or more or gradients of material or optical property gradients The term "polymer" will be understood to include polymers, copolymers (e.g., polymers formed using two or more different monomers), oligomers and combinations thereof, as well as polymers, oligomers, or copolymers that can be formed in a miscible blend by, for example, co-extrusion or reaction, including transesterification. Both block and random copolymers are included, unless indicated otherwise.

The term "polymeric material" will be understood to include polymers, as defined above, and other organic or inorganic additives, such as, for example, antioxidants, stabilizers, antiozonants, plasticizers, dyes, and pigments.

The term "cholesteric liquid crystal composition" refers to a composition including, but not limited to, a cholesteric liquid crystal compound, a cholesteric liquid crystal polymer or a cholesteric liquid crystal precursor such as, for example, lower molecular weight cholesteric liquid crystal compounds including monomers and oligomers that can be reacted to form a cholesteric liquid crystal polymer.

The term a "mixture" refers to an association of heterogeneous substances that may or may not be uniformly dispersed including, for example, a solution, dispersion and the like.

The term a "chiral" unit refers to an asymmetrical unit that does not posses a mirror plane. A chiral unit is capable of rotating a plane of polarization of light to either the left or the right in a circular direction.

The term a "mesogenic" unit refers to a unit having a geometrical structure that facilitates the formation of a liquid crystal mesophase.

The term a "nematic" liquid crystal compound refers to a liquid crystal compound that forms a nematic liquid crystal phase.

The term "solvent" refers to a substance that is capable of at least partially dissolving another substance (solute) to form a solution or dispersion. A "solvent" may be a mixture of one or more substances.

The term "chiral material" refers to chiral compounds or compositions, including chiral liquid crystal compounds and chiral non-liquid crystal compounds that can form or induce a cholesteric liquid crystal mesophase in combination with other liquid crystal material.

The term "polarization" refers to plane polarization, circular polarization, elliptical polarization, or any other nonrandom polarization state in which the electric vector of the beam of light does not change direction randomly, but either maintains a constant orientation or varies in a systematic manner. In plane polarization, the electric vector remains in a single plane, while in circular or elliptical polarization, the electric vector of the beam of light rotates in a systematic manner.

Reflective polarizers preferentially reflect light of one polarization and preferentially transmit the remaining light. In the case of reflective plane polarizers, light polarized in one plane is preferentially transmitted, while light polarized in the orthogonal plane is preferentially reflected. In the case of circular reflective polarizers, light circularly polarized in one sense, which may be the clockwise or counterclockwise sense (also referred to as right or left circular polarization), is preferentially transmitted and light polarized in the opposite sense is preferentially reflected. One type of circular polarizer includes cholesteric liquid crystal polarizers.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Cholesteric liquid crystal compounds generally include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions may also include achiral liquid crystal compounds (nematic) mixed with or containing a chiral unit. Cholesteric liquid crystal compositions or materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal compositions are also referred to as chiral nematic liquid crystal compositions. The pitch of the cholesteric liquid crystal composition or material is the distance (in a direction perpendicular to the director and along the axis of the cholesteric helix) that it takes for the director to rotate through 360°. This distance is generally 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For light propagating along the helical axis, Bragg reflection generally occurs when the wavelength, $\lambda$, is in the following range $$n_o p < \lambda < n_e p$$

where p is the pitch and $n_o$ and $n_e$ are the principal refractive indices of the cholesteric liquid crystal material. For example, the pitch can be selected such that the Bragg reflection is peaked in the visible, ultraviolet, or infrared wavelength regimes of light.

Cholesteric liquid crystal compounds, including cholesteric liquid crystal polymers, are generally known and typically any of these materials can be used to make optical bodies. Examples of suitable cholesteric liquid crystal polymers are described in U.S. Pat. Nos. 4,293,435 and 5,332,522, 5,886,242, 5,847,068, 5,780,629, 5,744,057 all of which are incorporated herein by reference. Other cholesteric liquid crystal compounds can also be used. A cholesteric liquid crystal compound may be selected for a particular application or optical body based on one or more factors including, for example, refractive indices, surface energy, pitch, processability, clarity, color, low absorption in the wavelength of interest, compatibility with other components (e.g., a nematic liquid crystal compound), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

Cholesteric liquid crystal polymers are generally formed using chiral (or a mixture of chiral and achiral) molecules (including monomers) that can include a mesogenic group (e.g., a rigid group that typically has a rod-like structure to facilitate formation of a liquid crystal phase). Mesogenic groups include, for example, para-substituted cyclic groups (e.g., para-substituted benzene rings). The mesogenic groups are optionally bonded to a polymer backbone through a spacer. The spacer can contain functional groups having, for example, benzene, pyridine, pyrimidine, alkyne, ester, alkylene, alkene, ether, thioether, thioester, and amide functionalities. The length or type of spacer can be altered to provide different properties such as, for example, solubilities in solvent(s).

Suitable cholesteric liquid crystal polymers include polymers having a chiral or achiral polyester, polycarbonate, polyamide, polyacrylate, polymethacrylate, polysiloxane, or polyesterimide backbone that include mesogenic groups optionally separated by rigid or flexible co-monomers. Other suitable cholesteric liquid crystal polymers have a polymer backbone (for example, a polyacrylate, polymethacrylate, polysiloxane, polyolefin, or polymalonate backbone) with chiral and achiral mesogenic side-chain groups. The side-chain groups are optionally separated from the backbone by a spacer, such as, for example, an alkylene or alkylene oxide spacer, to provide flexibility.

To form a cholesteric liquid crystal layer, a cholesteric liquid crystal composition can be coated or otherwise disposed onto a surface. The cholesteric liquid crystal composition includes a chiral component containing at least one (i) chiral compound, (ii) chiral monomer that can be used (e.g., polymerized or crosslinked) to form a cholesteric liquid crystal polymer, or (iii) a combination thereof. The cholesteric liquid crystal composition can also include a non-chiral component that contains at least one (i) nematic liquid crystal compound, (ii) nematic liquid crystal monomer that can be used to form a nematic liquid crystal polymer, or (iii) a combination thereof. Together with the chiral component, the nematic liquid crystal compound(s) or nematic liquid crystal monomers can be used to modify the pitch of the cholesteric liquid crystal composition. The cholesteric liquid crystal composition can also include one or more additives, such as, for example, curing agents, crosslinkers, antiozonants, antioxidants, plasticizers, stabilizers, and ultraviolet, infrared, or visible light-absorbing dyes and pigments.

Cholesteric liquid crystal compositions can also be formed using two, three, or more different types of any of the following: chiral compounds, achiral compounds, cholesteric liquid crystals, cholesteric liquid crystal monomers, nematic liquid crystals, nematic liquid crystal monomers, latent nematic or chiral nematic materials (in which the latent material exhibits the liquid crystal mesophase in combination with other materials), or combinations thereof. The particular ratio(s) by weight of materials in the cholesteric liquid crystal composition will generally determine, at least in part, the pitch of the cholesteric liquid crystal layer.

The cholesteric liquid crystal composition is generally part of a coating composition that may include a solvent(s). In some instances, one or more of the liquid crystals, liquid crystal monomers, processing additives, or any other component of the cholesteric liquid crystal composition may also act as a solvent. In some cases, the solvent can be substantially removed or eliminated from the coating composition by, for example, drying the composition to evaporate the solvent or reacting a portion of the solvent (e.g., reacting a solvating liquid crystal monomer to form a liquid crystal polymer) or by cooling below the processing temperature of the composition.

After coating, the cholesteric liquid crystal composition is converted into a liquid crystal layer or material. This conversion can be accomplished by a variety of techniques including evaporation of a solvent; heating; crosslinking the cholesteric liquid crystal composition; or curing (e.g., polymerizing) the cholesteric liquid crystal composition using, for example, heat, radiation (e.g., actinic radiation), light (e.g., ultraviolet, visible, or infrared light), an electron beam, or a combination of these or like techniques.

As a result of the coating and conversion to cholesteric liquid crystal materials, a cholesteric reflective polarizer that is effective over a wide range of wavelengths can be produced, if desired. In some embodiments, the cholesteric reflective polarizer substantially reflects light over a spectral width of at least 100, 150, 200, 300, 400, 500 or 600 nm or more measured as full width at half peak height of the reflection spectrum.

Optionally, initiators can be included within the cholesteric liquid crystal composition to initiate polymerization or crosslinking of monomeric components of the composition. Examples of suitable initiators include those that can generate free radicals to initiate and propagate polymerization or crosslinking. Free radical generators can also be chosen according to stability or half-life. Preferably the free radical initiator does not generate any additional color in the cholesteric liquid crystal layer by absorption or other means. Examples of suitable free radical initiators include thermal free radical initiators and photoinitiators. Thermal free radical initiators include, for example peroxides, persulfates, or azonitrile compounds. These free radical initiators generate free radicals upon thermal decomposition.

Photoinitiators can be activated by electromagnetic radiation or particle irradiation. Examples of suitable photoinitiators include, onium salt photoinitiators, organometallic photoinitiators, metal salt cationic photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources can be used. Photoinitiators can be chosen based on the absorption of particular wavelengths of light.

An aligned cholesteric liquid crystal phase can be achieved using conventional treatments. For example, a method of developing a cholesteric liquid crystal phase includes depositing the cholesteric liquid crystal composition on an oriented substrate. The substrate can be oriented using, for example, drawing techniques or rubbing with rayon or other cloth. Photoalignment orientated substrates are described in U.S. Pat. Nos. 4,974,941, 5,032,009, 5,389,698, 5,602,661, 5,838,407, and 5,958,293. After deposition, the cholesteric liquid crystal composition is heated above the glass transition temperature of the composition to the liquid crystal phase. The composition can be cooled into a glassy state and the composition remains in the liquid crystal phase. Alternatively or in addition, the composition can be photoset while in the liquid crystal phase.

Cholesteric liquid crystal compositions can be formed into a layer that substantially reflects light having one circular polarization (e.g., left or right circularly polarized light) and substantially transmits light having the other circular polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material and the Bragg reflection peak is typically blue-shifted from its on-axis wavelength. Cholesteric liquid crystal materials are generally characterized with respect to normally incident light, as done below, however, it will be recognized that the response of these materials can be determined for non-normally incident light using known techniques.

Optical bodies can be formed by disposing at least one cholesteric liquid crystal material on a substrate. The surface of the substrate (e.g., the surface of an alignment layer provided as part of the substrate) has a surface alignment feature that can improve or provide uniformity of alignment of the cholesteric liquid crystal material disposed thereon. A surface alignment includes any surface features that produce alignment of the director of the liquid crystal material at that surface. Surface alignment features can be produced by a variety of different methods including, for example, unidirectional rubbing of the substrate, stretching the substrate, or photoalignment of a photopolymerizable material by light, among others.

The substrate can provide a base for deposition or formation of an optical body or structure including the various cholesteric liquid crystal compounds. The substrate can be a structural support member during manufacture, use, or both. The substrate may be transparent over the wavelength range of operation of the optical body. Examples of substrates include cellulose triacetate (TAC, available from, for, example, Fuji Photo Film Co., Tokyo, Japan; Konica Corporation, Toyko, Japan; and Eastman Kodak Co., Rochester, N.Y.), SOllx™ (available from General Electric Plastics, Pittsfield, Mass.), and polyesters, such as polyethylene terphathalate (PET). In some embodiments, the substrate is non-birefringent.

The substrate can have more than one layer. In one embodiment, the substrate contains an alignment layer having a surface capable of orienting a liquid crystal composition disposed on the alignment layer in a fairly uniform direction. Alignment layers can be made using mechanical or chemical methods. Mechanical methods of making an alignment layer include, for example, rubbing or stretching a polymer layer in the desired alignment direction. For example, polyvinyl alcohol, polyamide, and polyimide films can be aligned by rubbing the film in the desired alignment direction. Films that can be aligned by stretching include, for example, polyvinyl alcohol, polyolefins such as, for example, polyethylene or polypropylene, polyesters such as, for example, polyethylene terphthalate or polyethylene naphthalate, and polystyrene. The polymer film can be a homopolymer, a copolymer, or a mixture of polymers.

An alignment layer can be formed photochemically. For example, photo-orientable polymers can be formed into alignment layers by irradiation, or by using anisotropically absorbing molecules disposed in a medium or on a substrate with light (e.g., ultraviolet light) that is linearly polarized relative to the desired alignment direction, as described in U.S. Pat. Nos. 4,974,941, 5,032,009, and 5,958,293, all of which are incorporated herein by reference. Suitable photo-orientable polymers include polyimides including, for example, substituted 1,4-benzenediamines.

Another class of photoalignment materials can be used to form alignment layers. These polymers selectively react in the presence of polarized ultraviolet light along or perpendicular to the direction of the electric field vector of the polarized ultraviolet light, which once reacted, have been shown to align liquid crystal compositions or materials. Examples of these materials are described, for example, in U.S. Pat. Nos. 5,389,698, 5,602,661, and 5,838,407, all of which are incorporated herein by reference.

Photoisomerizable compounds such as, for example, azobenzene derivatives are also suitable for photoalignment, as described in U.S. Pat. No. 6,001,277, incorporated herein by reference. Alignment layers can also be formed by coating certain types of lyotropic molecules which orient due to shear applied during coating. Molecules of this type are disclosed, for example, in U.S. Pat. No. 6,395,354, herein incorporated by reference.

The optical bodies can be combined with other optical or physical elements. In one, embodiment, a triacetyl cellulose (TAC) film can be attached to the optical body using an adhesive. In another embodiment, a laminate can be formed using the substrate and another polymer film. In one embodiment, a TAC or quarter wave film can be laminated to the substrate. Alternatively, the TAC or quarter wave film can be laminated to a layer containing the cholesteric liquid crystal material. The quarter wave film can convert the transmitted circularly polarized light to linearly polarized light. After passing through a quarter wave film, circularly polarized light is converted into linearly polarized light with its polarization axis + or −45 degrees away from the optical axis of the quarter wave film, with the direction determined by the specific circular polarization state. In another embodiment, the substrate itself can be a quarter wave film.

The cholesteric liquid crystal layer can be used alone or in combination with other layers or devices to form an optical body, such as, for example, a reflective polarizer. Cholesteric liquid crystal polarizers are used in one type of reflective polarizer. The pitch of a cholesteric liquid crystal polarizer is similar to the optical layer thickness of multilayer reflective polarizers. Pitch and optical layer thickness respectively determine the center wavelength of the cholesteric liquid crystal polarizers and multilayer reflective polarizers. The rotating director of the cholesteric liquid crystal polarizer forms optical repeat units similar to the multiple layers in multilayer reflective polarizers having the same optical layer thickness.

The center wavelength, $\lambda_0$, and the spectral bandwidth, $\Delta\lambda$, of the light reflected by the cholesteric liquid crystal layer depend on the pitch, p, of the cholesteric liquid crystal. The center wavelength, $\lambda_0$, is approximated by:

$$\lambda_0 = 0.5(n_o + n_e)p$$

where $n_o$ and $n_e$ are the refractive indices of the cholesteric liquid crystal for light polarized parallel to the director of the liquid crystal ($n_e$) and for light polarized perpendicular to the director of the liquid crystal ($n_o$). The spectral bandwidth, $\Delta\lambda$, is approximated by:

$$\Delta\lambda = 2\lambda_0(n_e - n_o)/(n_e + n_o) = p(n_e - n_o).$$

When the birefringence of the material ($n_e - n_o$) is $\leq 0.2$, the spectral bandwidth or width (measured as full width at half peak height) of a cholesteric liquid crystal composition is generally 100 nm or less. This limits the usefulness of a cholesteric liquid crystal polymer when reflectivity over the entire visible light range (400 to 750 nm) or other wavelength range substantially larger than 100 nm is desired.

To make a reflective polarizer capable of reflecting a broad range of wavelengths, multiple pitch lengths can be used. Broadband cholesteric liquid crystal polarizers have been previously formed by laminating or otherwise stacking two separately-formed cholesteric liquid crystal coatings, each disposed on an individual substrate, with different pitches (e.g., having different compositions, for example, different ratios by weight of chiral and nematic liquid crystal components). Each layer has a different pitch and, therefore, reflects light having a different wavelength.

With a sufficient number of layers, a polarizer can be constructed that reflects a large portion of or the entire visible light spectrum. These constructions tend to have a non-uniform transmission or reflection spectra because each layer reflects a different region of light. The uniformity can be improved somewhat by allowing some diffusion of the liquid crystals between the various layers during construction. These layers can be heated to diffuse some liquid crystal material between the layers. This can result in an averaging of the pitches between the various layers.

This method, however, requires a substantial number of processing steps including separately forming each layer (e.g., individually drying or curing each layer), stacking (e.g., laminating) the layers, and then heating the layers to cause diffusion of liquid crystal material between the two layers. This also requires substantial processing time, particularly, in view of the time required for diffusion between the two previously formed liquid crystal layers which are typically polymeric in nature.

New techniques for making cholesteric liquid crystal optical bodies have been developed. These techniques include solvent and material selection to facilitate forming three or more cholesteric liquid crystal layers on a substrate from a single coating mixture.

In an illustrative embodiment, a new method of forming cholesteric liquid crystal bodies includes forming three or more cholesteric liquid crystal layers from a single coating mixture, each of the cholesteric liquid crystal layers can have different optical properties. The coating mixture can include a first cholesteric liquid crystal composition, a second cholesteric liquid crystal composition, and a solvent. After coating a substrate with the coating mixture, a first, second, and third layer can be formed on the substrate. The single coating mixture includes one or more solvent(s) and two, three, or more cholesteric liquid crystal compositions that are at least partly soluble in the solvent(s).

The method of the invention can form three or more cholesteric liquid crystal layers with different optical properties. Optical properties that can differ include, for example, pitch which can include effective pitch ($[n_e + n_o]/2 \times p$), and handedness.

In one embodiment, the mixture includes a first liquid crystal polymer, a second cholesteric liquid crystal monomer, and a second cholesteric liquid crystal polymer that is optionally formed from a portion of the second cholesteric liquid crystal monomer. The first cholesteric liquid crystal polymer and the second cholesteric liquid crystal polymer are different and have at least some level of incompatibility.

The second cholesteric liquid crystal polymer can be present in the mixture prior to coating the coating mixture onto the substrate. Alternatively or in addition, the second cholesteric liquid crystal polymer can be formed from the second cholesteric liquid crystal monomer after the coating mixture is coated onto the substrate.

As solvent is removed from the coating mixture the first cholesteric liquid crystal polymer and the second cholesteric liquid crystal monomer at least partially separate into layers. In one embodiment, the first cholesteric liquid crystal polymer forms a layer adjacent the substrate and the second cholesteric liquid crystal monomer forms a layer on the first cholesteric liquid crystal polymer, generating a substantially bi-layer structure on the substrate. The second liquid crystal polymer can be distributed within either or both of the first cholesteric liquid crystal polymer layer and the second cholesteric liquid crystal monomer layer.

A tri-layer construction can then be formed from the substantially bi-layer structure by partial curing such that the physical properties of one or more of the second liquid crystal monomer, first liquid crystal polymer, and the second liquid crystal polymer are altered resulting in at least a portion of the second liquid crystal polymer migrating to a position between the second liquid crystal monomer layer and the first liquid crystal polymer layer. For example, by heating the bi-layer structure or at least partially curing the bi-layer structure with U.V. radiation, the solubility of the second liquid crystal monomer in the second liquid crystal polymer may be decreased causing the second liquid crystal monomer to at least partially separate from the second liquid crystal polymer to form a tri-layer structure. In this example, an optical body includes a first layer, a second layer, and a third layer disposed between the first and second layers. The first layer, which can be adjacent to the substrate, includes a majority of the first cholesteric liquid crystal polymer. The second layer includes a majority of the second cholesteric liquid crystal monomer. The third layer includes the second cholesteric liquid crystal polymer. This cholesteric liquid crystal material in this structure can then be heated to form an aligned optical body. This aligned optical body can then be fully cured to form a fully cured optical body.

It is understood that materials to form the first and second liquid crystal polymers and the second liquid crystal monomer material are interchangeable and any combination of material and/or solvent achieving separation of one cholesteric material from another cholesteric material to form at least three cholesteric layers from a single coating mixture is within the scope of this invention.

A second coating mixture that includes one or more cholesteric liquid crystal compositions can be disposed on the tri-layer structure described above. The second coating composition that can form one, two, three, or more layers using the methods described above.

The first or second coating mixtures can additionally include a reactive monomer material to crosslink, in addition to polymerize. This reactive monomer material may be a reactive monomer and, in some embodiments is a cholesteric liquid crystal compound, a precursor for a cholesteric liquid crystal polymer, or a chiral compound. For example, the reactive monomer material can be, for example, a di(meth)acrylate, an epoky-acrylate, a diepoxide, a divinyl, a diallyl ether or other reactive material. This reactive monomer "sets" or "fixes" the cholesteric liquid crystal layer(s) and prevents or substantially reduces any movement of material within the layer(s) over time. In one embodiment, the reactive monomer includes the second cholesteric liquid crystal monomer.

The methods and configurations described herein have advantages over previous techniques, in which each layer had been formed independently and subsequently heated to induce diffusion to mix portions of the cholesteric liquid crystal polymer layers. In these prior techniques, the resulting product continued to experience diffusion between layers of different composition over time, particularly when the product was utilized in an application with heat production, such as many display applications. This continued diffusion can result in changes in the optical properties of the product over time.

In contrast, the technique disclosed herein for cross-linking or curing the cholesteric liquid crystal layer(s) provides a method for substantially reducing or preventing further movement after curing or cross-linking by increasing molecular weight and reducing the availability of mobile monomer materials for diffusion or movement. Thus, the optical properties of the resulting optical body can be substantially stable over time and can be used to produce a reliable product with a long lifetime. In addition, when the components of each layer are relatively incompatible they tend to move away from each other as solvent is removed. Thus, both the incompatibility effects and the cross-linking provides an optical body that is substantially stable over time and can be used to produce a more reliable product with a longer lifetime as compared to prior art optical bodies.

While not wishing to be bound by any particular theory, it is believed that a driving force for forming at least three layers having different optical properties from a single mixture involves the relative incompatibility of the three or more cholesteric compositions. This relative incompatibility may be represented or understood by the X interaction parameter, interfacial tension, solubility parameter, or surface tension measurements. Any of these will be useful for characterizing liquid crystal materials that will phase separate. The formation of layers can depend on many factors including, but not limited to, viscosity, phase transition temperatures, solvent compatibility, molecular weight of the polymer, difference in surface tension, cholesteric liquid crystal phase morphology, and temperature of the components. For example, it is useful for one material to have a lower surface tension than another material to help drive it toward the top layer or surface. In addition, it can be useful to form a layer at a temperature high enough so that it is in the chiral nematic phase which typically has a lower viscosity. It is also useful for one material to have a relatively low viscosity at a processing temperature to reduce the time for phase separation to occur. It is also useful for the first cholesteric liquid crystal polymer layer (which may be the lower layer) to have sufficiently low viscosity to provide for enhanced mobility of the components. Consolidation and reduction of interfacial surface area are driving forces for the layer formation. The low viscosity of the polymer may be accomplished by selection of its composition, molecular weight, temperature, solvent balance, and plasticizer content.

Other processes can be used to enhance layer formation. For example, using two different solvents with different compatibilities for the cholesteric materials, as one solvent evaporates, one material can be released from the solution to form a layer while the other material(s) remains in solution. Alternatively or in addition, materials with very different nematic transition temperatures can be used so that one material is in its (relatively) low viscosity nematic phase while the other is a more viscous amorphous phase, thereby encouraging separation. Alternatively or in addition, one material could be at least partially cured to increase its viscosity or change its solubility and enhance separation.

Molecular weight differences can also be used. If two relatively incompatible cholesteric polymers are formed with different molecular weights, they will often have very different viscosities, which will enhance separation and layer formation.

Temperature can also be varied during the layer formation process. First, the temperature can be above the nematic transition temperature of one cholesteric compound but less than the nematic transition temperature of a second cholesteric compound. This will help the first material to form a cholesteric phase layer and enhance separation. The temperature can then be raised above the nematic transition temperature of the second cholesteric compound so that material will form its cholesteric phase layer. The cholesteric layers can then be fixed or set as described above.

The methods described above can be performed using a variety of techniques and equipment. The figures show a distinct physical boundary between layers for illustrative purposes only. As described herein, a "layer" will be understood to include a single physical thickness or a single optical thickness. A single physical thickness can include a distinct boundary layer as shown in the figures or can include a non-distinct boundary layer such as, for example, a compositional gradient between layers. A single optical thickness can be observed by an optical property such as, for example, reflection of light about a range of wavelengths. It is understood that zones between layers can include one or more or gradients of material or optical property gradients.

Figure 2:
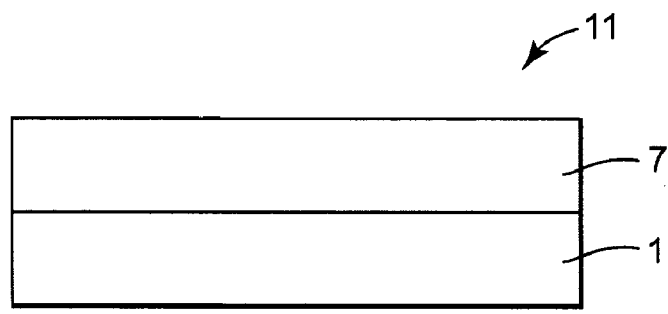
FIG. 2 is a schematic representation of a cross-section of a first coating mixture on a substrate, according to the invention.

FIG. 1 illustrates an example of a suitable method and device for accomplishing forming three cholesteric liquid crystal layers with a single coating composition onto a substrate. A coating apparatus 10 includes a carrier 5 (e.g., a conveyor belt or a sliding platform) that conveys a substrate 1 past a first coating dispenser 4. Alternatively, the substrate 1 can be a continuous web that is pulled through the apparatus 10 through use of drive rolls. The use of drive rolls, or a similar mechanism, for moving the substrate 1 and one or more coating layers can eliminate the necessity for a carrier 5, located underneath the substrate 1. A first coating mixture 7 is dispensed through a first coating head 6 and onto the substrate 1. Any coating technique can be used including, for example, knife coating, bar coating, slot coating, gravure coating, roll coating, spray coating, or curtain coating. FIG. 2 shows the first coating mixture 7 on the substrate to form a coated substrate 11. In one embodiment, the first coating mixture 7 includes a solvent, a first cholesteric liquid crystal polymer, and a second cholesteric liquid crystal composition that are at least partly soluble in the solvent. The first cholesteric liquid crystal polymer is relatively incompatible with the second cholesteric liquid crystal composition.

In one illustrative embodiment, the second cholesteric liquid crystal composition includes a nematic or cholesteric liquid crystal monomer and a liquid crystal polymer formed by a portion of the nematic or cholesteric liquid crystal monomer. In another illustrative embodiment, the second cholesteric liquid crystal composition includes a nematic or cholesteric liquid crystal monomer. In this embodiment, a liquid crystal polymer is later formed by a portion of the nematic or cholesteric liquid crystal monomer after the mixture 7 is coated onto the substrate 1.

The second cholesteric liquid crystal composition can further include a chiral additive, particularly if a nematic liquid crystal monomer is used. The first cholesteric liquid crystal polymer can form a thermoplastic layer.

The first coating mixture 7 and substrate 1 pass through a first drying oven 8 to remove at least a portion of the solvent. Removal of at least a portion of the solvent from the coating mixture 7 causes the first cholesteric liquid crystal polymer to at least partially separate from the second cholesteric liquid crystal composition forming a two layered structure 20 having a first layer 21 and a second layer 22 (see FIG. 3). In addition, heating in the first drying oven 8 can polymerize of at least a portion of the second liquid crystal composition which can be useful for creating a later formed third layer between the first layer 21 and the second layer 22, as desired.

The bi-layered structure 20 and substrate 1 can pass through a first curing station 2 containing, for example, a heat or light source to cure (partially or fully) the two layered structure 20, if the two layered structure 20 contains curable components and if it is desired to cure those components at this stage of the process. The first curing station 2 can be placed at one or more various positions relative to the position of the substrate 1.

In an illustrative embodiment, a low dose UV light partially cures (cross-links or polymerizes) a portion of the second cholesteric liquid crystal composition (e.g., second cholesteric liquid crystal monomer and/or second cholesteric liquid crystal polymer.) Then, the partially cured two layered structure 20 can pass through a second drying oven 9 to further heat the two layered structure 20. The second drying oven 9 can remove solvent, increase mobility, and enhance layer separation or alignment.

Figure 3:
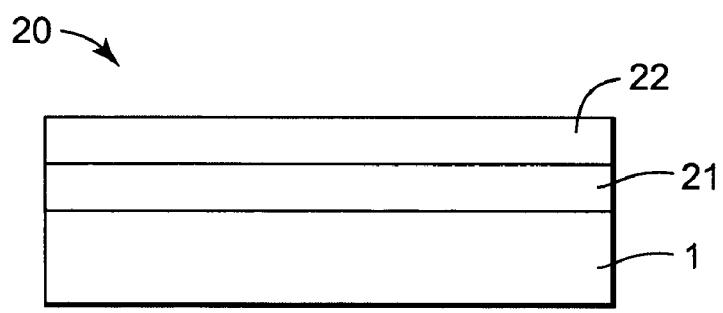
FIG. 3 is a schematic representation of a cross-section of two cholesteric liquid crystal layers on a substrate, according to the invention.
Figure 4:
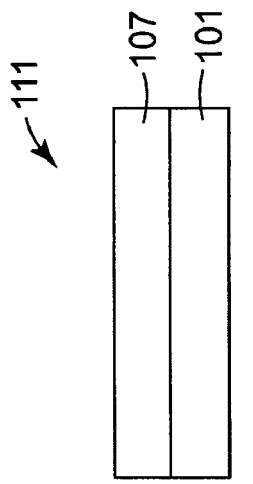
FIG. 4 is a schematic representation of a cross-section of three cholesteric liquid crystal layers on a substrate, according to the invention.

FIG. 4 shows a structure where further heating of the partially cured bi-layered structure 20 (see FIG. 3) causes the second cholesteric liquid crystal polymer to at least partially separate from the first cholesteric liquid crystal polymer and/or the second liquid crystal monomer to form a layer between first cholesteric liquid crystal polymer layer and the second liquid crystal monomer layer. This three layer structure 30 has a first layer 31, a second layer 32, and a third layer 33 disposed between the first layer 31 and the second layer 32. This three layered structure 30 and substrate 1 can pass through a second curing station 3 containing, for example, a heat or light source to cure (partially or fully) the three layered structure 30, if the three layered structure 30 contains curable components and if it is desired to cure those components at this stage of the process. The second curing station 3 can be placed at one or more various positions relative to the position of the substrate 1. In an illustrative embodiment, an electron beam irradiates and fully cures the three layered structure 30 including the second cholesteric liquid crystal monomer layer to substantially cross-link or polymerize the second cholesteric liquid crystal monomer layer.

FIGS. 2, 3 and 4 illustrate various stages of the method illustrated by FIG. 1. In one embodiment of the invention, as illustrated in FIG. 2, the first coating mixture 7 (described above) is applied to the substrate 1. FIG. 3 illustrates the two layered structure 20. The first cholesteric liquid crystal polymer may form a first layer 21 disposed on the substrate 1. The second cholesteric liquid monomer may form a second layer 22 disposed on top of the first layer 21.

FIG. 4 illustrates the three layered structure 30. A third layer 33 is disposed between the first layer 31 and the second layer 32. The first layer 31, second layer 32, and third layer 33 may have the same or different thickness. The relative thickness of each layer 31, 32, 33 can be controlled by, for example, by selection of materials, relative amounts of materials; temperature, viscosity, polymer molecular weight, or a combination of these variables. The thickness of the first layer 31, the second layer 32, and the third layer 33 can be any useful thickness, as desired. The thickness of the first layer 31, the second layer 32, and the third layer 33 can be independently selected from 1 to 10 micrometers or 2 to 5 micrometers or 3 to 4 micrometers for visible light and thicker for IR light, for example.

In an illustrative embodiment, the first layer 31 contains a cholesteric liquid crystal composition that once aligned, reflects a portion of light spectrum not reflected by the second layer 32, or third layer 33. For example, the first layer 31 may reflect red, blue, green or yellow visible light and the second layer 32 may reflect a color of visible light that is not reflected by the first layer 31 and the third layer 33 may reflect a color of visible light that is not reflected by the first layer 31 and/or second layer 32. Specifically, the first layer 31 may reflect blue visible light and the second layer 32 may reflect red visible light and the third layer may reflect yellow or green visible light, for example. It is understood that each layer's reflection bandwidth can at least partially overlap with another layer's reflection bandwidth. In some embodiments, at least partial overlap of the light reflection bandwidths is desired.

Figure 5:
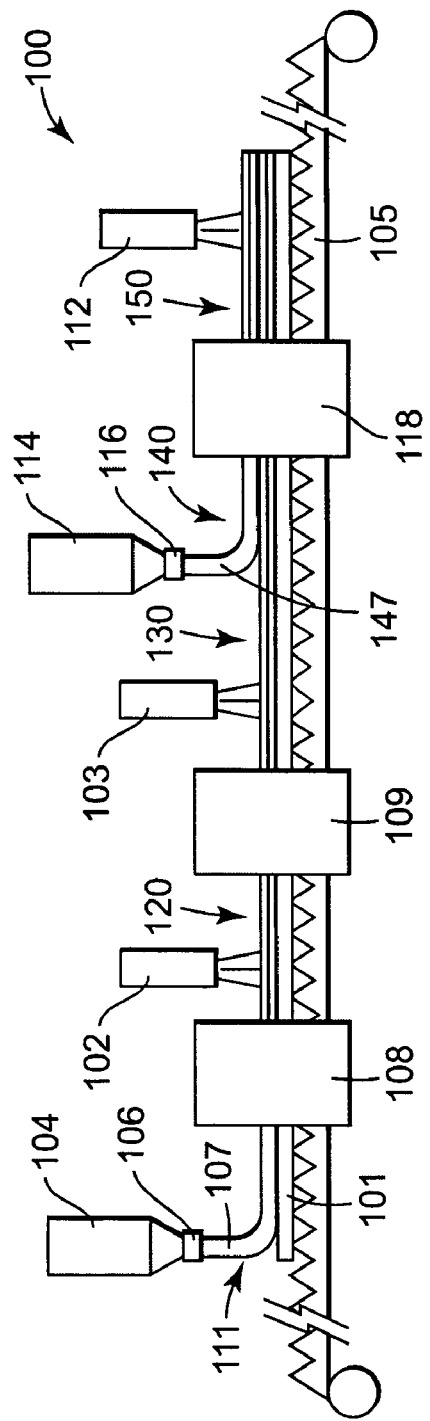
FIG. 5 is a schematic representation of one embodiment of a method and apparatus for forming three cholesteric liquid crystal layers with a single coating composition onto a substrate and sequentially forming another cholesteric liquid crystal layer onto the first three cholesteric liquid crystal layers, according to the invention.

FIG. 5 illustrates an example of a suitable method and device for forming four or more cholesteric liquid crystal layers with two coating compositions. The first three cholesteric liquid crystal layers can be formed as described in accordance with FIG. 1 and as described above. Specifically, a coating apparatus 100 includes a carrier 105 (e.g., a conveyor belt or a sliding platform) that conveys a substrate 101 past a first coating dispenser 104. A first coating mixture 107 is dispensed through a first coating head 106 and onto the substrate 101.

The first coating mixture 107 and substrate 101 pass through a first drying oven 108 to remove solvent. Removal of at least a portion of the solvent from the first coating mixture 107 causes the first cholesteric liquid crystal polymer to at least partially separate from the second cholesteric liquid crystal composition forming a two layered structure 120 having a first layer 121 and a second layer 122 (see FIG. 7). In addition, heating in the first drying oven 108 can cause polymerization of at least a portion of the liquid crystal monomers that form a portion of the second liquid crystal composition and these formed polymers can be useful for creating a later formed third layer between the first layer 121 and the second layer 122, as desired.

The two layered structure 120 and substrate 101 can pass through a first curing station 102 containing, for example, a heat or light source to cure (partially or fully) the two layered structure 120, if the two layered structure 120 contains curable components and if it is desired to cure those components at this stage of the process. The first curing station 102 can be placed at one or more various positions relative to the position of the substrate 101. In an illustrative embodiment, a low dose UV light partially cures (cross-links or polymerizes) a portion of the second liquid crystal composition that is useful for creating a later formed third layer between the first layer 121 and the second layer 122, as desired. Then, the cured two layered structure 120 can pass through a second drying oven 109 to further heat the two layered structured as described above.

Figure 8:
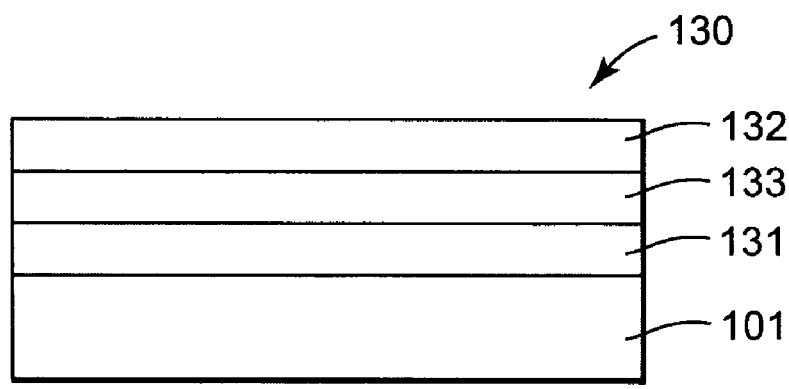
FIG. 8 is a schematic representation of a cross-section of three cholesteric liquid crystal layers on a substrate, according to the invention.

Further heating of the cured two layered structure 120 causes the second cholesteric liquid crystal polymer to accumulate between the first cholesteric liquid crystal polymer layer and the second cholesteric liquid monomer layer forming a three layered structure 130 having a first layer 131, a second layer 132, and a third layer 133 (see FIG. 8). This three layered structure 130 and substrate 101 can pass through a second curing station 103 containing, for example, a heat or light source to cure (partially or fully) the three layered structure 130, if the three layered structure 130 contains curable components and it is desired to cure those components at this stage of the process. In an illustrative embodiment, an electron beam irradiates and fully cures the three layered structure 130.

A second coating dispenser 114 then dispenses a second coating 147 (see FIG. 9) through a second coating head 116 onto the second layer 132 forming a coated tri-layer structure 140. Again, any coating technique can be used. In one embodiment, the second coating 147 includes a solvent and a third cholesteric liquid crystal composition.

Figure 10:
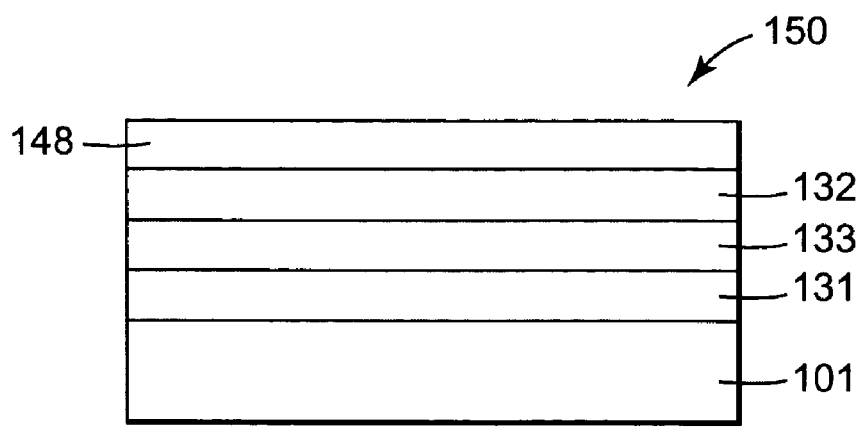
FIG. 10 is a schematic representation of a cross-section of a fourth cholesteric liquid crystal material layer on three cholesteric liquid crystal material layers on a substrate, according to the invention.

The coated tri-layer structure 140 can pass through a third drying oven 118 to remove solvent forming a fourth layer 148 (see FIG. 10). The second coating 147 and/or fourth layer 148 and substrate 101 can be passed through a third curing station 112 containing, for example, a heat or light source to polymerize (partially or fully) the second coating 147 and/or fourth layer 148, if the composition 147 and/or fourth layer 148 contain curable components and if it is desired to cure those components at this stage of the process.

The second coating composition 147 can contain cholesteric liquid crystal compositions that once aligned, cover a portion of light spectrum not covered with the first three layers 131, 132, 133. In some embodiment, it is desired that the aligned cholesteric liquid crystal layers reflection bandwidths at least partially overlap with one another.

Figure 6:
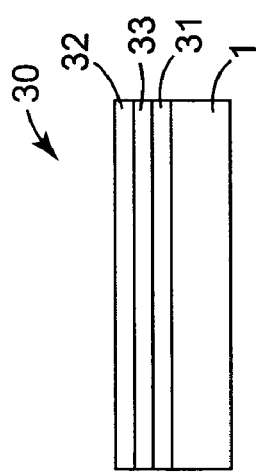
FIG. 6 is a schematic representation of a cross-section of a first coating mixture on a substrate, according to the invention.
Figure 7:
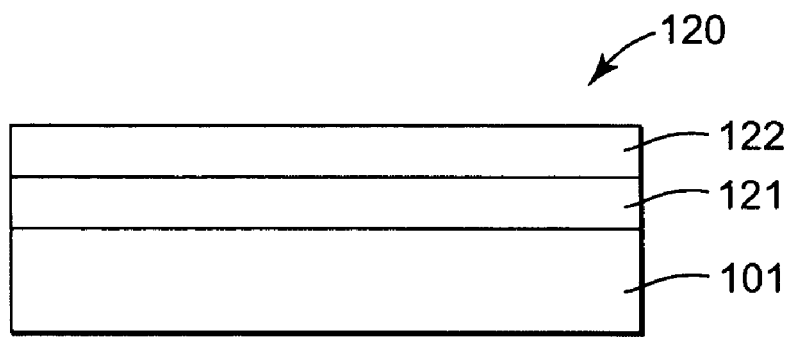
FIG. 7 is a schematic representation of a cross-section of two cholesteric liquid crystal layers on a substrate, according to the invention.
Figure 9:
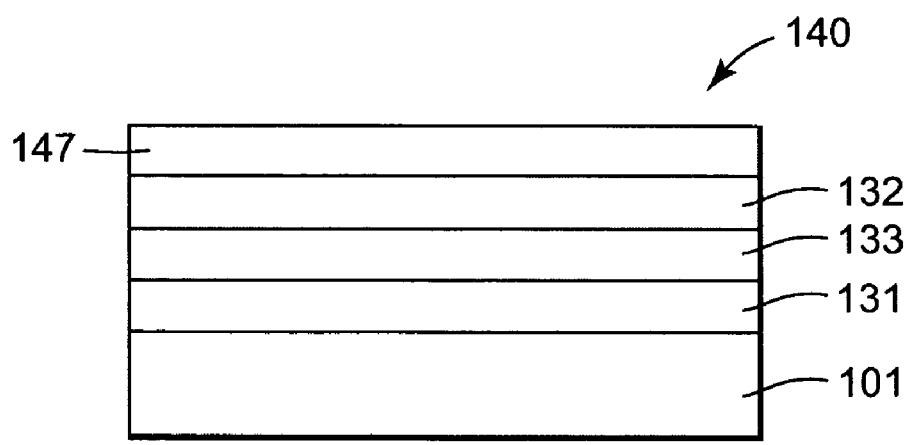
FIG. 9 is a schematic representation of a cross-section of a second coating mixture on three cholesteric liquid crystal layers on a substrate, according to the invention.
Figure 11:
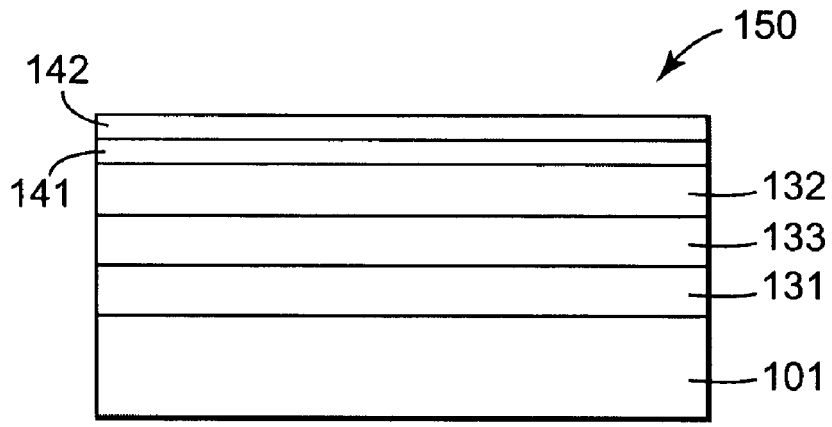
FIG. 11 is a schematic representation of a cross-section of a fourth and fifth cholesteric liquid crystal material layer on three cholesteric liquid crystal material layers on a substrate, according to the invention.
Figure 12:
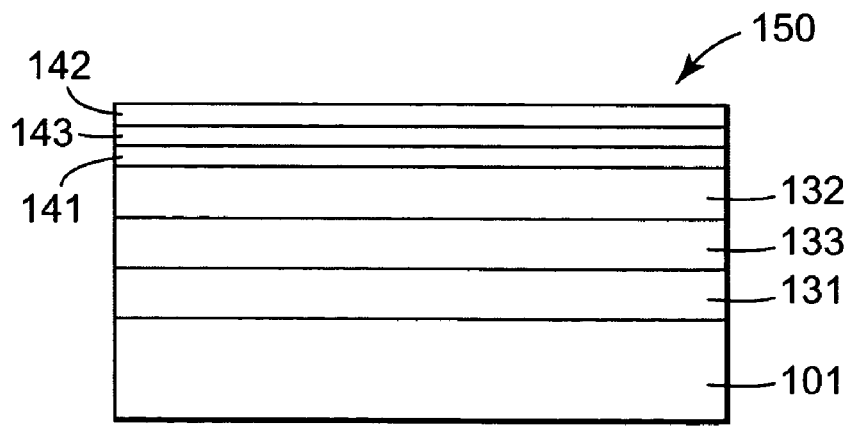
FIG. 12 is a schematic representation of a cross-section of a fourth, fifth, and sixth cholesteric liquid crystal material layer on three cholesteric liquid crystal material layers on a substrate, according to the invention.

FIGS. 6, 7, 8, 9, 10, 11, 12 illustrate various stages of the method illustrated by FIG. 6. In one embodiment of the invention, as illustrated in FIG. 6, the first coating mixture 107 (described above) is applied to the substrate 101. FIG. 7 illustrates the two layered structure 120. The first cholesteric liquid crystal composition may form a first layer 121 disposed on the substrate 101. The second cholesteric liquid composition may form a second layer 122 disposed on top of the first layer 121. FIG. 8 illustrates the three layered structure 130. A third layer 123 is disposed between the first layer 121 and the second layer 122. FIG. 9 illustrates a second coating 147 (described above) disposed on the three layered structure 130. FIG. 10 illustrates a four layer structure 150 where the fourth layer 148 has been aligned and optionally cured. FIG. 11 illustrates a five layer structure 150 where the fourth layer 141 and fifth layer 142 has been aligned and optionally cured. FIG. 12 illustrates a six layer structure 150 where the fourth layer 141, fifth layer 142, and sixth layer 143 has been aligned and optionally cured. The fourth layer 148, 141, fifth layer 142, and sixth layer 143 can be formed of any combination of cholesteric compositions described above suitable for forming additional layers on the three layered structure from a single coating mixture.

The speed of the substrate 1, 101 can also be controlled to change the duration of treatment by the ovens 8, 9, 108, 109, 118 or curing stations 2, 3, 102, 103, 112. The duration of treatment by each oven may be any length of time such as, for example, up to 30 minutes or up 15 minutes or 1 to 10 minutes or 1 to 6 minutes or less than 1 minute. The oven temperature may be high enough to vaporize the solvent or above the nematic transition temperature and low enough to prevent degradation of the materials within the optical body. The oven temperature may be at least 55° C., 75° C., or from 80° C. to 140° C. or 100° C. to 120° C.

The rate of mass transfer from a single layer into two, three, or more separate layers depends upon a variety of factors including, for example, the specific materials used in each composition, the percentages of materials in these compositions, the molecular weight of the materials, the temperature of the compositions, the remaining solvents, the viscosity of the compositions, and the degree of polymerization of each composition. A desired mass transfer rate can be obtained by controlling one or more of these variables, for example, by choice of materials, temperature, viscosity, polymer molecular weight, or any combination of these variables. The coating compositions may be placed in an oven or other heating unit to increase the mass transfer rate of the liquid crystal compositions away from each other into two separate distinct layers and the mass transfer rate of solvent leaving the coating compositions. This oven can also be used to partially or fully remove the solvents from the coating compositions, if desired.

The devices and methods illustrated in FIG. 1 to FIG. 12 can be modified to sequentially coat more than three coating compositions onto a substrate. For example, additional coating dispensers, ovens, or light sources can be added to the apparatus. In addition, the number of ovens or curing stations can be increased or decreased to optimize the overall process of forming an optical body.

As an example, a broadband reflective polarizer can be formed according to the methods and configurations described herein. This broadband reflective polarizer can substantially uniformly (e.g., with no more than 10% or 5% variation) reflect light of one polarization over a wavelength range of 100 nm, 200 nm, 300 nm, 400 nm, 500 nm, or more. In particular, a broadband reflective polarizer can be formed that substantially uniformly reflects light of one polarization over the visible wavelength range (e.g., from 400 to 750 nm).

Figure 13:
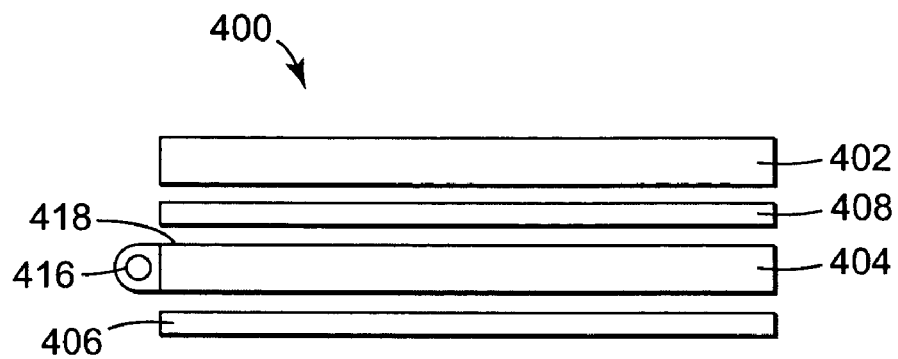
FIG. 13 is a schematic illustration of one embodiment of a liquid crystal display, according to the invention.

The cholesteric liquid crystal optical bodies can be used in a variety of optical displays and other applications, including transmissive (e.g., backlit), reflective, and transflective displays. For example, FIG. 13 illustrates a schematic cross-sectional view of one illustrative backlit display system 400 including a display medium 402, a backlight 404, a cholesteric liquid crystal reflective polarizer 408, as described above, and an optional reflector 406. The display system optionally includes a quarter wave plate as part of the cholesteric liquid crystal reflective polarizer or as a separate component to convert the circularly polarized light from the liquid crystal reflective polarizer to linearly polarized light. A viewer is located on the side of the display device 402 that is opposite from the backlight 404.

The display medium 402 displays information or images to the viewer by transmitting light that is emitted from the backlight 404. One example of a display medium 402 is a liquid crystal display (LCD) that transmits only light of one polarization state.

The backlight 404 that supplies the light used to view the display system 400 includes, for example, a light source 416 and a light guide 418, although other backlighting systems can be used. Although the light guide 418 depicted in FIG. 13 has a generally rectangular cross-section, backlights can use light guides with any suitable shape. For example, the light guide 418 can be wedge-shaped, channeled, a pseudo-wedge guide, etc. The primary consideration is that the light guide 418 be capable of receiving light from the light source 416 and emitting that light. As a result, the light 418 can include back reflectors (e.g., optional reflector 406), extraction mechanisms and other components to achieve the desired functions.

The reflective polarizer 408 is an optical film that includes at least one cholesteric liquid crystal optical body, as described above. The reflective polarizer 408 is provided to substantially transmit light of one polarization state exiting the light guide 418 and substantially reflect light of a different polarization state exiting the light guide 418.

Figure 14:
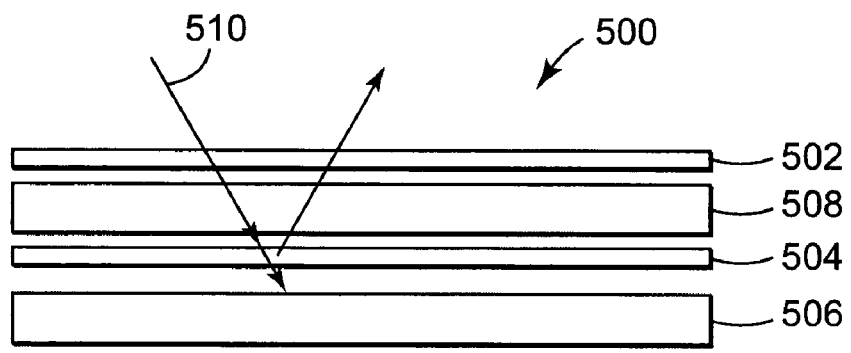
FIG. 14 is a schematic illustration of another embodiment of a liquid crystal display, according to the invention.

FIG. 14 is a schematic illustration of one type of reflective liquid crystal display 500. This reflective liquid crystal display 500 includes a display medium 508, a cholesteric liquid crystal reflective polarizing mirror 504, an absorptive backing 506, and an absorptive polarizer 502. The liquid crystal display 500 optionally includes a wave plate as part of the cholesteric liquid crystal reflective polarizer 504 or as a separate component to convert mixed polarization light from the liquid crystal device to an appropriately polarized light.

Liquid crystal display 500 functions first by the absorptive polarizer 502 polarizing light 510. The polarized light then travels through the display medium 508 and one of the light's circular polarization components reflects from the cholesteric liquid crystal reflective polarizing mirror 504 and passes back through the display medium 508 and absorptive polarizer 502. The other circular polarization component passes through the cholesteric liquid crystal reflective polarizer 504 and is absorbed by the backing 506. The reflective polarizer 504 of this reflective liquid crystal display 500 includes one cholesteric liquid crystal optical body, as described above. The specific choice of cholesteric liquid crystal optical body can depend on factors such as, for example, cost, size, thickness, materials, and wavelength range of interest.

Figure 15:
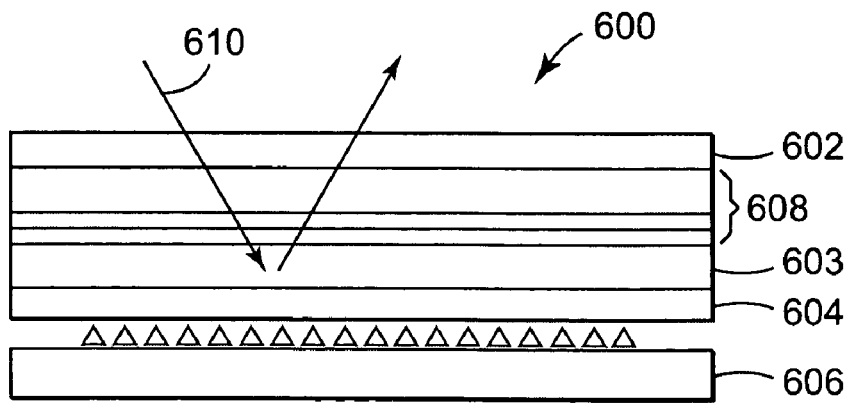
FIG. 15 is a schematic illustration of another embodiment of a liquid crystal display, according to the invention.

FIG. 15 is a schematic illustration of one type of transflective liquid crystal display 600. This transflective liquid crystal display 600 includes a phase retarding display medium 608, a partial mirror 603, a cholesteric liquid crystal reflective polarizing mirror 604, a backlight 606, and an absorptive polarizer 602. The display system optionally includes a wave plate as part of the cholesteric liquid crystal reflective polarizer 604 or as a separate component to convert mixed polarization light from the liquid crystal device to an appropriately polarized light. In the reflective mode, bright ambient light 610 is polarized by the absorptive polarizer 602, travels through the display medium 608, reflects off the partial mirror 603, and passes back through the display medium 608 and absorptive polarizer 602. In low ambient-light situations, the backlight 606 is activated and light is selectively passed through the cholesteric polarizer 604, matched to provide appropriately polarized light to the display. Light of the opposite handedness is back-reflected, recycled, and selectively passed through the cholesteric polarizer 604 to effectively increase backlight brightness. The reflective polarizer of this reflective liquid crystal display 600 includes one cholesteric liquid crystal optical body, as described above. The specific choice of cholesteric liquid crystal optical body can depend on factors such as, for example, cost, size, thickness, materials, and wavelength range of interest.

The cholesteric liquid crystal optical body can be used with a variety of other components and films that enhance or provide other properties to a liquid crystal display. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, multilayer dielectric back reflectors, and holographic back reflectors.

EXAMPLES

Example 1

A first portion of the coating solution (Solution A) was prepared for the coating procedure as follows. 21 grams of cyanobiphenyl benzoate ethyl acrylate (see below) was polymerized with 1.5 grams of LC 756 (a chiral liquid crystal monomer commercially available from BASF) in 77 grams of dioxolane (commercially available from Aldrich Chemical Co., Milwaukee, Wis.) using 0.75 grams of Vazo 52 (commercially available from Dupont, Wilmington, Del.) as a thermal initiator and 0.25 grams of carbon tetrabromide (commercially available from Aldrich Chemical Co., Milwaukee, Wis.) as a chain transfer additive. This reaction was run for 16 hours at 60° C.

A second portion of the coating solution (Solution B) was prepared for the coating procedure as follows. 3.8 grams of LC 252 (a nematic liquid crystal monomer commercially available from BASF) was polymerized in 95 grams of dioxolane using 1.2 grams of Vazo 52 and 0.05 grams of BHT (2,6 di-tert-butyl-4-methylphenol commercially available from Aldrich Chemical Co., Milwaukee, Wis.). This reaction was run at 80° C. for 1 hour.

The coating solution was formed by combining 34.5 grams of Solution A, 27.6 grams of Solution B, 0.6 grams of LC 756, 10.4 grams of LC 242, 1.7 grams of phenyl ethyl acrylate (commercially available from Aldrich Chemical Co., Milwaukee, Wis.), 0.2 grams of BHT, 3 grams of cyanobiphenyl 4-methoxybenzoate (see below), and 11 grams of cyclohexanone (commercially available from Aldrich Chemical Co., Milwaukee, Wis.).

The preparation of cyanobiphenyl benzoate ethyl acrylate is described in European Patent Application Publication No. 834754, which is incorporated herein by reference. The structure of cyanobiphenyl benzoate ethyl acrylate is:

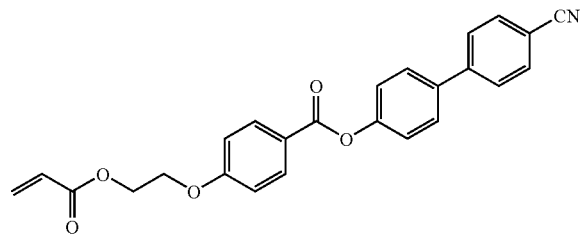

Cyanobiphenyl 4-methoxybenzoate was prepared by first combining 40 g (0.26 moles) of 4-methoxybenzoic acid, 53.2 g (0.525 moles) triethylamine, and 400 ml of 1,2-dimethoxyethane in a round bottomed flask fitted with a mechanical stirrer and a thermometer, under an atmosphere of nitrogen. The solution was cooled to −30° C., at which point 30.1 g (0.263 moles) of methane sulfonyl cholride was added. Stirring was continued, and the temperature was maintained at −30° C. for about 1 hour. Next, 51.32 g (0.263 moles) of 4'-hydroxy-1,1'-biphenyl-4-carbonitrile and 3.2 g (0.026 moles) of 4-dimethylaminopyridene were added and the mixture was heated to 50° C. and maintained at that temperature with stirring for about 3 hours. The mixture was then cooled to room temperature and 1 liter of $H_2O$ was added. A solid product precipitated, was collected by filtration, and was washed with water and air dried. The crude material was then recrystallized from a minimal amount of tetrahydrofuran to obtain the desired material.

Compound LC 756 (Paliocolor™ LC 756 is commercially available from BASF) and Compound LC 242 (Paliocolor™ LC 242) are liquid crystal monomers available from BASF Corp. (Ludwigshafen, Germany). Vazo™ 52 (DuPont, Wilmington, Del.) is a thermally decomposable substituted azonitrile compound used as a free radical initiator.

This solution was coated on a 100 micrometer PET substrate (commercially available as Scotchpar from 3M, St. Paul, Minn.) using a wire round rod to produce a 6 micrometer thick dried coating. The coating was air dried 30 seconds at room temperature and then baked at 125° C. for twelve minutes. The coating was then cured with a Fusion 300 watt D bulb using a speed of 30 ft/min under an inert atmosphere. The coating was then reheated at 120° C. for 10 minutes.

Figure 16:
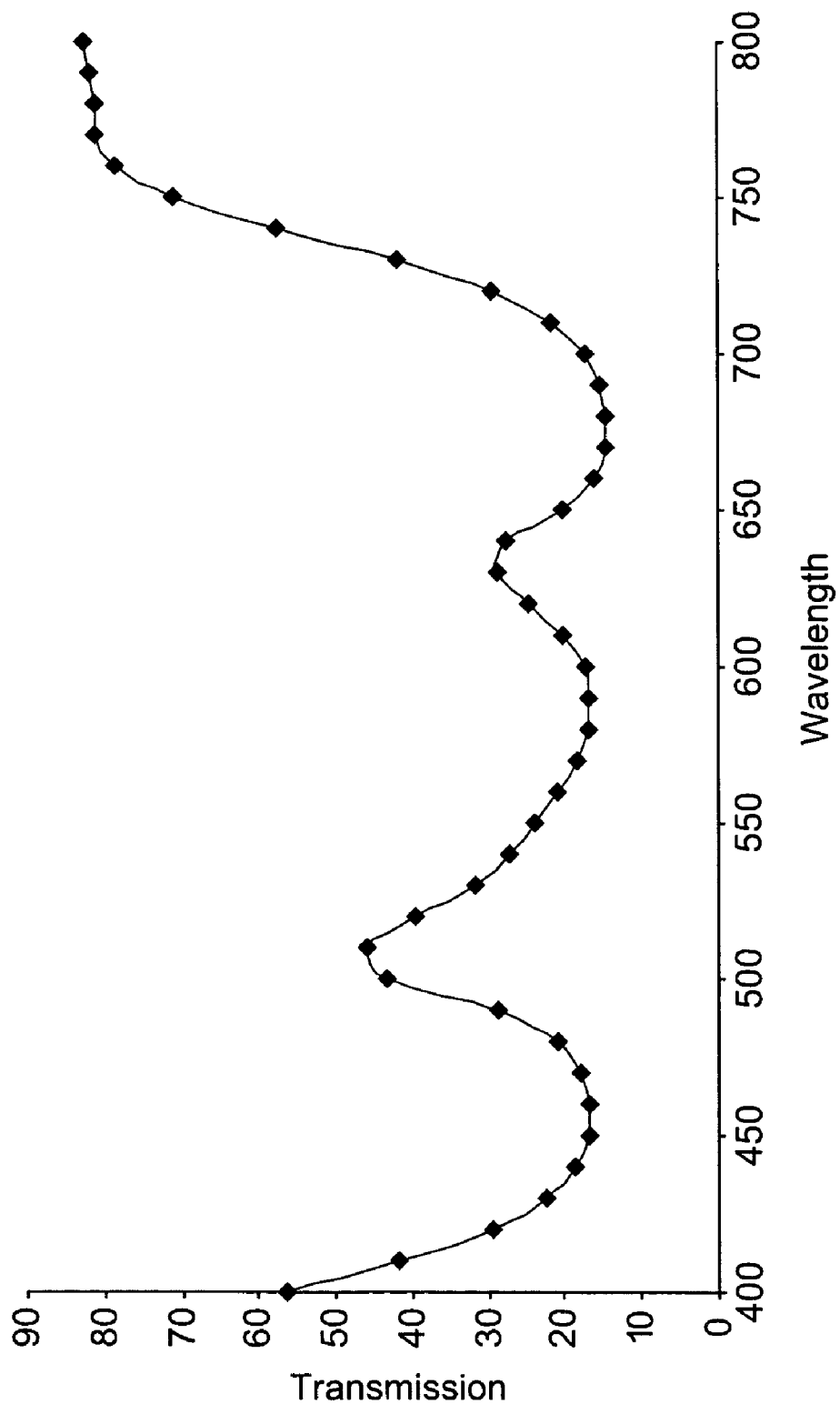
FIG. 16 is a light transmission spectrum of an optical body formed according to Example 1.

Finally, a Lambda™ 900 spectrophotometer (Perkin Elmer, Santa Clara, Calif.) was used to measure the optical performance of the optical body. A quarter-wave film was placed in front of the coating and a standard linear polarizer was placed first in the light path and the polarizer was rotated 45 degrees from the wave plate's principle axes to give left handed circular polarization and the transmission through the coating was measured in a range from 400 nm to 700 nm. Three extinction peaks were seen. A first extinction peak was centered at 460 nm. A second extinction peak was centered at 580 nm. A third extinction peak was centered at 680 nm. The results of this transmission over the measured wavelength range are illustrated in FIG. 16.

Example 2

A portion of the coating solution (Solution A) was prepared for the coating procedure as follows. 22.5 grams of cyanobiphenyl benzoate ethyl acrylate was polymerized with 2.3 grams of LC 756 in 74.4 grams of dioxolane using 0.8 grams of Vazo 52 as a thermal initiator. This reaction was run for 16 hours at 60° C.

The coating solution was formed by combining 27.4 grams of Solution A, 0.6 grams of LC 756, 13.7 grams of LC 242, 0.25 grams of phenyl ethyl acrylate, 0.097 grams of BHT, 3.4 grams of cyanobiphenyl 4-methoxybenzoate, and 10 grams of cyclohexanone and 44.7 grams of dioxolane. The solution was heated at 90° C. for 2 minutes. During this heating period a minor portion of the LC242 and LC756 react to form a copolymer.

Figure 17:
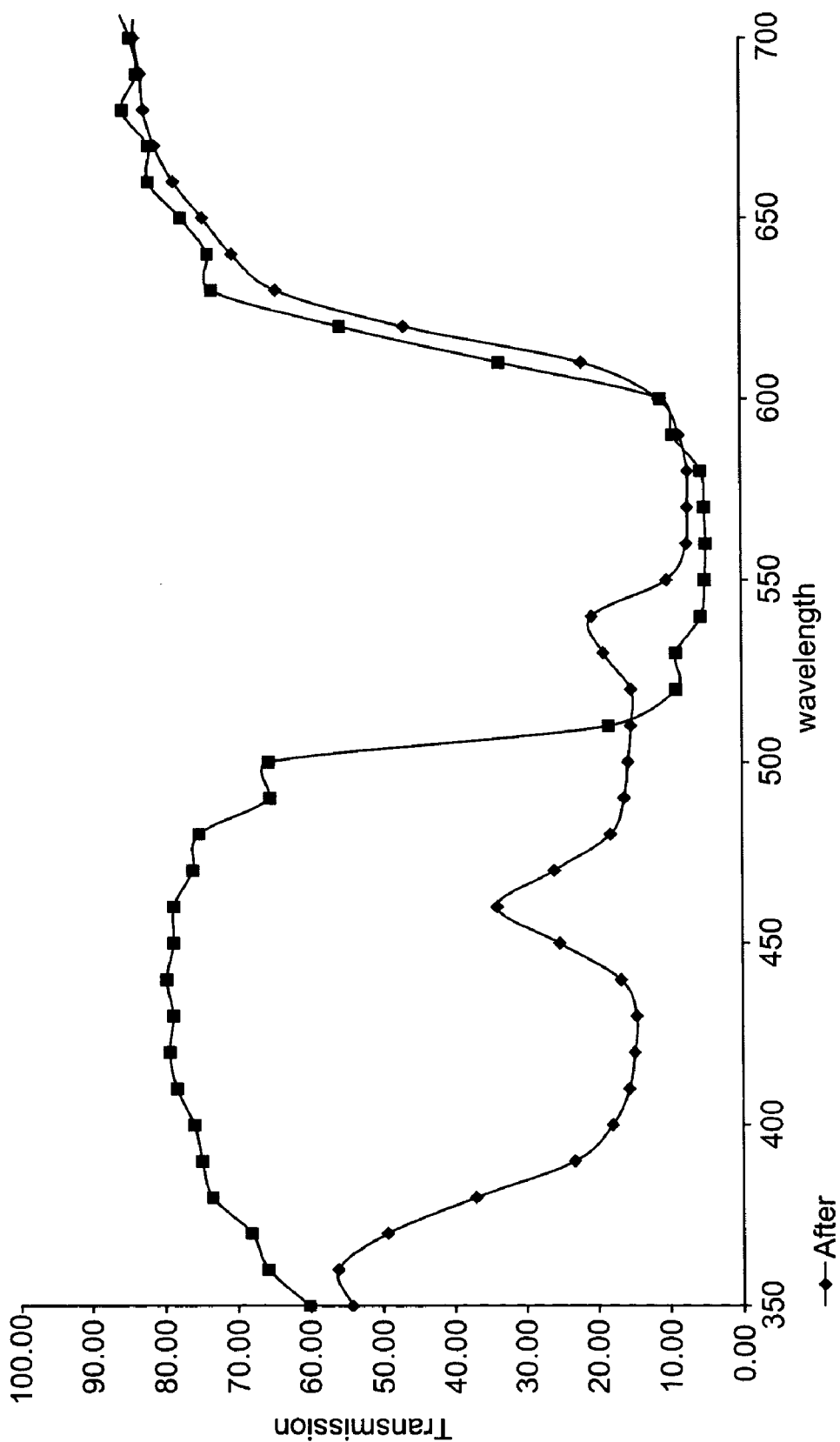
FIG. 17 is a light transmission spectrum of an optical body formed according to Example 2.

This solution was coated on a 100 micrometer PET substrate (commercially available as Scotchpar from 3M, St. Paul, Minn.) using a wire round rod to produce a 6 micrometer thick dried coating. The coating was air dried 30 seconds at room temperature and then baked at 125° C. for twelve minutes. The coating was then cured with a Fusion 300 watt D bulb using a speed of 30 ft/min and nitrogen inerting. The spectra of the coating was measured as in Example 1 then the coating was again heated at 120° C. for 10 minutes and the spectra was again measured. It can be seen that that coating initially forms 2 peaks (FIG. 17 Before) indicative of a bilayer structure and following the second heating forms a third peak (FIG. 17 After) indicating that a third layer has formed.

Example 3

A first portion of the coating solution (Solution A) was prepared for the coating procedure as follows. 26.4 grams of cyanobiphenyl benzoate ethyl acrylate was polymerized with 0.88 grams of LC 756 in 71.5 grams of dioxolane using 1.0 grams of Vazo 52 as a thermal initiator. This reaction was run for 16 hours at 60° C.

A second portion of the coating solution (Solution B) was prepared for the coating procedure as follows. 4.0 grams of LC 252 was polymerized in 94.7 grams of dioxolane using 1.29 grams of Vazo 52 and 0.004 grams of BHT (2,6 di-tert-butyl-4-methylphenol). This reaction was run at 80° C. for 1 hour.

The coating solution was formed by combining 22.3 grams of Solution A, 21.6 grams of Solution B, 0.28 grams of LC 756, 8.0 grams of LC 242, 0.45 grams of benzyl alcohol (commercially available from Aldrich Chemical Co., Milwaukee, Wis.), 0.15 grams of BHT, 3.76 grams of cyanobiphenyl 4-methoxybenzoate, and 4.8 grams of cyclohexanone and 37 grams of dioxolane.

This solution was coated on a 100 micrometer PET substrate (commercially available as Scotchpak from 3M, St. Paul, Minn.) using a wire round rod to produce a 6 micrometer thick dried coating. The coating was air dried 30 seconds at room temperature and then baked at 125° C. for twelve minutes. The coating was then cured with a Fusion 300 watt D bulb using a speed of 30 ft/min and nitrogen inerting. The coating was then reheated at 120° C. for 10 minutes.

Figure 18:
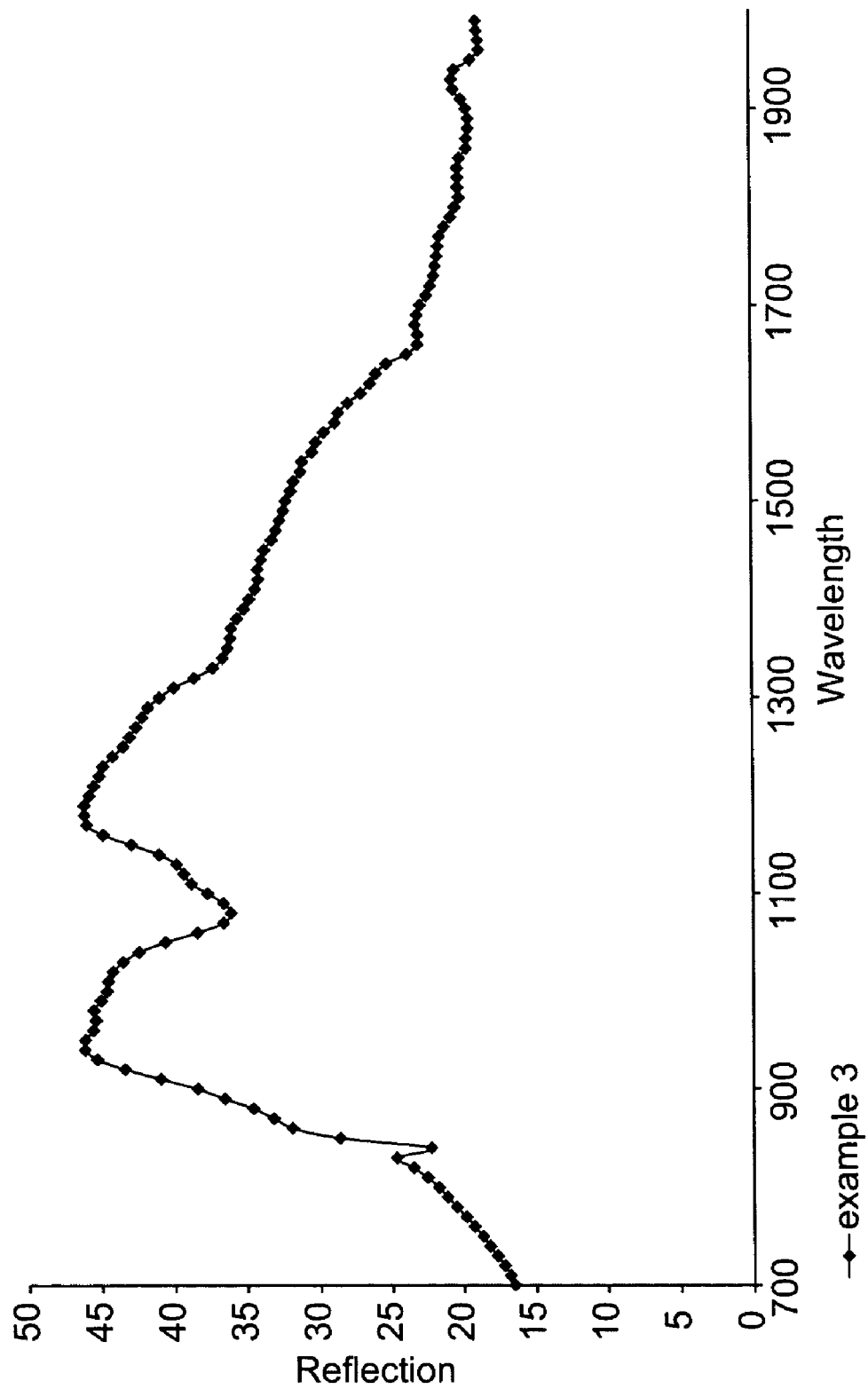
FIG. 18 is a light reflection spectrum of an optical body formed according to Example 3.

Finally, a Lambda™ 900 spectrophotometer (Perkin Elmer, Santa Clara, Calif.) was used to measure the optical performance of the optical body as described above. The spectra was measured in reflectance mode from 700 nm to 2000 nm the spectra (FIG. 18) possessed three reflection peaks; one at about 1000 nm, one at 1200 nm and one at 1550 nm.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A method of making an optical body, the method comprising:
    coating a mixture on a substrate, wherein the mixture comprises a first cholesteric liquid crystal polymer, a second cholesteric liquid crystal monomer, a second cholesteric liquid crystal polymer formed by polymerizing a portion of the second cholesteric liquid crystal monomer prior to coating the mixture on the substrate, and a solvent; wherein the first cholesteric liquid crystal polymer is different than the second cholesteric liquid crystal polymer; and
    forming from the mixture an optical body comprising a first layer, a second layer, and a third layer disposed between the first layer and the second layer, on the substrate; wherein the first layer comprises a majority of the first cholesteric liquid crystal polymer, the second layer comprises a majority of a second cholesteric liquid crystal monomer and the third layer comprises the second cholesteric liquid crystal polymer.

2. The method according to claim 1, wherein forming a first layer and a second layer on the substrate comprises removing at least a portion of the solvent from the mixture.

3. The method according to claim 1, further comprising curing the second cholesteric liquid crystal monomer after forming the first and second layer on the substrate.

4. A method of making an optical body, the method comprising:
    coating a mixture on a substrate to form a coated substrate, wherein the mixture comprises a first cholesteric liquid crystal polymer, a second cholesteric liquid crystal monomer, a second cholesteric liquid crystal polymer formed by polymerizing a portion of the second cholesteric liquid crystal monomer prior to coating the mixture on the substrate, and a solvent; wherein the first liquid crystal polymer is different than the second cholesteric liquid crystal polymer;
    heating the coated substrate to remove at least a portion of the solvent;
    curing the coated substrate to form a partially cured coated substrate; and
    heating the partially cured coated substrate to form an aligned optical body.

5. The method according to claim 4, further comprising curing the aligned optical body to form a cured optical body.

6. The method according to claim 4, wherein the aligned optical body reflects a bandwidth of circular polarized light of at least 200 nm when visible light is transmitted through the aligned optical body.

7. The method according to claim 4, wherein heating the coated substrate causes the first cholesteric liquid crystal polymer to at least partially separate from the second cholesteric liquid crystal monomer.

8. The method according to claim 7, wherein heating the partially cured coated substrate to form an aligned optical body causes the second cholesteric liquid crystal polymer to form a layer between a layer comprising a majority of the first cholesteric liquid crystal polymer and a layer comprising a majority of the second cholesteric liquid crystal monomer.

9. The method according to claim 4, wherein curing the coated substrate to form a partially cured coated substrate partially cross-links the second liquid crystal monomer.

10. The method according to claim 4, wherein heating the partially cured coated substrate to form an aligned optical body further separates the first cholesteric liquid crystal polymer from the second cholesteric liquid crystal monomer.

11. A method of making an optical body, the method comprising:
    coating a mixture on a substrate to form a coated substrate, wherein the mixture comprises a first cholesteric liquid crystal polymer, a second cholesteric liquid crystal monomer, a second cholesteric liquid crystal polymer formed by polymerizing a portion of the second cholesteric liquid crystal monomer prior to coating the mixture on the substrate, and a solvent, and wherein the first liquid crystal polymer is different than the second cholesteric liquid crystal polymer; and
    forming an optical body from the mixture, wherein the optical body reflects circular polarized light when light is transmitted through the optical body.

12. The method according to claim 11, wherein forming an optical body comprises forming an optical body that reflects a bandwidth of light of at least 200 nm when light is transmitted through the optical body.

13. The method according to claim 11, wherein forming an optical body comprises forming an optical body that reflects a bandwidth of light of at least 300 nm when light is transmitted through the optical body.

14. The method according to claim 11, wherein forming an optical body comprises forming an optical body that reflects a bandwidth of light of at least 400 nm when light is transmitted through the optical body.

15. The method according to claim 11, wherein forming an optical body comprises forming an optical body that has a reflection spectrum having at least three maxima when light is transmitted through the optical body.

16. The method according to claim 11, wherein forming an optical body comprises forming an optical body that reflects at least 75% of either right-handed or left-handed circular polarized light.

* * * * *

UNITED STATES PATENT AND TRADEMARK OFFICE
CERTIFICATE OF CORRECTION

PATENT NO. : 7,510,741 B2  Page 1 of 1
APPLICATION NO. : 10/858238
DATED : March 31, 2009
INVENTOR(S) : Richard J. Pokorny It is certified that error appears in the above-identified patent and that said Letters Patent is hereby corrected as shown below:

Column 3,
Line 64, After "gradients" insert -- . --.

Column 8,
Line 33, Delete "SOllx™" and insert -- Sollx™ --, therefor.
Line 34-35, Delete "terphathalate" and insert -- terephthalate --, therefor.
Line 50, Delete "terphthalate" and insert -- terephthalate --, therefor.

Column 11,
Line 47, Delete "epoky" and insert -- epoxy --, therefor.

Column 19,
Line 30, Delete "cholride" and insert -- chloride --, therefor.
Line 34, Delete "dimethylaminopyridene" and insert -- dimethylaminopyridine --, therefor.

Signed and Sealed this

Second Day of June, 2009

JOHN DOLL
*Acting Director of the United States Patent and Trademark Office*